Figure 1:
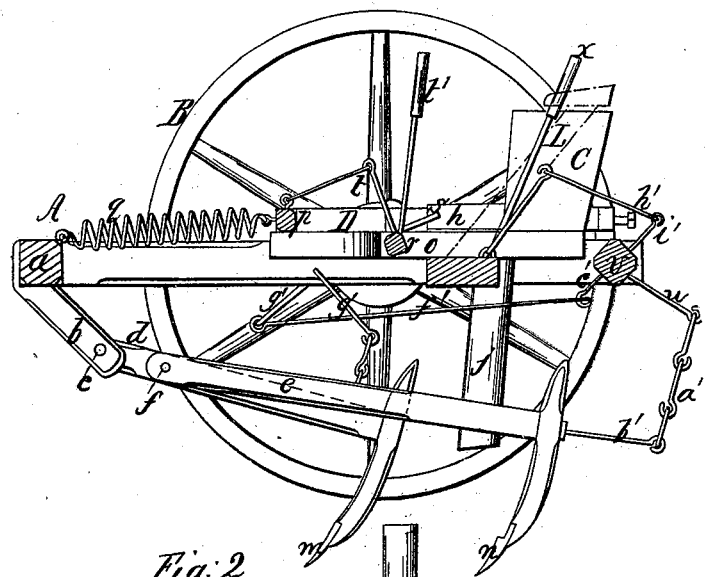

Fitzpatrick & Knull.
Corn Planter.

No. 98,157.  Patented Dec. 21, 1869.

Witnesses:
Phil. T. Dodge
E. J. Sommer

Inventors:
D. Fitzpatrick &
John Knull,
by Dodge & Munn
atty's

United States Patent Office.

D. FITZPATRICK AND JOHN KNULL, OF ST. PARIS, OHIO.

Letters Patent No. 98,157, dated December 21, 1869.

IMPROVEMENT IN CORN-PLANTERS.

The Schedule referred to in these Letters Patent and making part of the same.

*To all whom it may concern:*

Be it known that we, D. FITZPATRICK and JOHN KNULL, of St. Paris, in the county of Champaign, and State of Ohio, have invented certain new and useful Improvements in Corn-Planters; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention relates to corn-planters; and

It consists in a novel manner of constructing and arranging a sulky corn-planter, as hereinafter described.

In the drawings—

Figure 2:
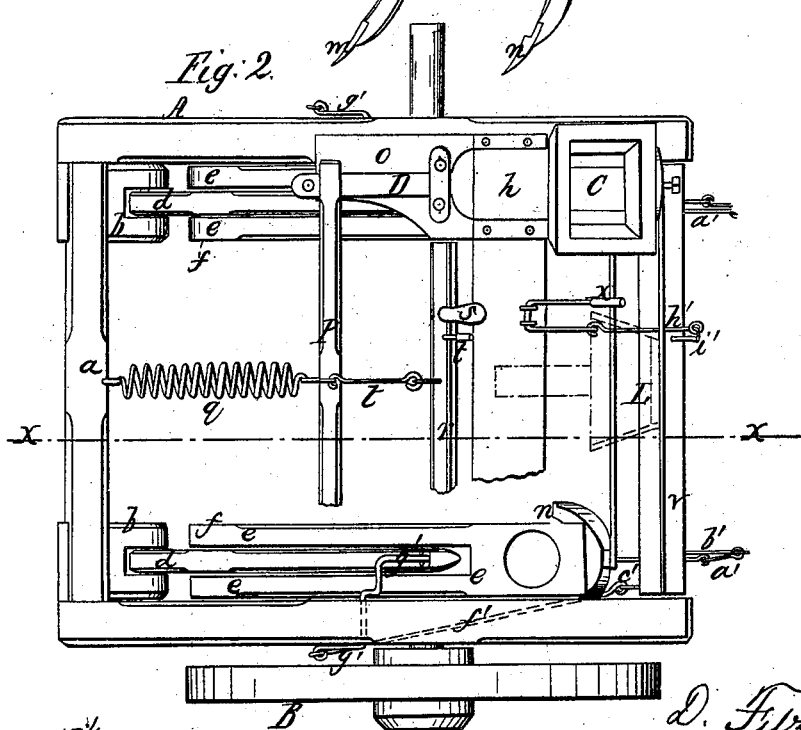

Figure 1 is a longitudinal vertical section of our improved planter, taken on the line $x$-$x$ of fig. 2, and Figure 2 is a top plan view of the machine, with a portion broken away.

A is the frame of the machine, rectangular in form, and mounted on the two wheels B.

$a$ is the front cross-bar of the frame, at each end of which a depending arm, $b$, is secured, these arms being forked at their lower ends, and having an inclination backward of about forty-five degrees.

$d$ $d$ are drag-bars, having their front ends connected to the forked arms $b$ $b$, and each provided at its rear end with a standard and shovel, $m$, as shown in figs. 1 and 2.

$e$ $e$ are two forked drag-bars, attached one to each of the bars $d$, by pivots $f$, as shown in figs. 1 and 2, the bars $d$ fitting between the two arms of the bars $e$, and the connection of the two being close behind the point at which the former are connected to arms $b$.

The bars $e$ extend beyond the bars $d$, and are each provided on their rear end with a forked or V-shaped standard, to which two shovels, $n$ $n$, are attached, as shown in fig. 2.

It will be seen that although the drag-bars $d$ and $e$ are connected, each can rise and fall independently of the other.

On each of the rear corners of the frame A, we secure a broad board, $o$, and through each of these boards, make a hole, and secure below it, to the under side of the board, a flexible tube, $j$, which passes down through a hole in the corresponding drag-bar $e$, and discharges behind the shovel $m$, as shown in figs. 1 and 2.

On top of each of the boards $o$ we place a slide, D, provided with an expansible hole or cell, and connect the two slides at their front ends, by a cross-bar, $p$, this cross-bar being drawn forward by a spring, $q$, connecting it with bar $a$.

Over each of the slides D we locate a hopper, $c$, and shield, $h$, the hopper being in the rear of the hole in board $o$.

$r$ is a rock-shaft, secured across the frame behind, and parallel with bar $p$, and having an upright arm, which is connected by a link, $t$, with said bar $p$.

We also provide this rock-shaft with a hand-lever, $t'$, and a treadle, $s$, so that it may be operated either by hand or foot. By operating the shaft $r$, the bar $p$ is drawn back, moving slides D, and bringing their cells under the hopper, when they are filled with corn, and upon releasing the shaft, the spring $q$ draws the slides forward, bringing their pockets over the conductors $j$, through which the corn descends, falling into the furrow opened by shovel $m$. After the corn is dropped into the furrow opened by shovel $m$, the two shovels $n$ $n$ following behind, turn the earth in upon, and cover it.

$v$ is a rock-shaft, located across the rear end of the frame, and having an upright arm, $i'$, which is connected by a rod or link, $h'$, with the hand-lever $x$, which is pivoted to the frame at one side of the driver's seat, L, as shown in figs. 1 and 2, so that by operating the said lever, the shaft is turned.

$w$ $w$ are backwardly-extending arms on the shaft $v$, each connected by a chain, with the rods $a'$, attached to the end of drag-bars $e$, so that by turning the shaft $v$, the bars $e$ are elevated.

$c'$ $c'$ are depending arms, one at each end of shaft $v$, as shown in fig. 1.

$g'$ $g'$ are rods or levers, each passing through a side bar of the frame, and each having two arms at about right angles to each other, one on the outside and the other on the inside of the frame.

The inner arms of rods $g'$ are connected with the respective drag-bar $d$, and the outer arms by rods $f'$, with the arms $c'$ of shaft $v$.

By this arrangement, as the lever $x$ is operated, and the shaft $i$ turned, the arms $w$ will raise the drag-bars $e$, and the arm $c'$ will, through the medium of rods $f'$ and rods $g'$, elevate the drag-bars $d$, the simple movement of the lever $x$ thus serving to lift all four drag-bars.

When our machine, thus constructed, is in operation, the teeth $m$ open the furrow, the conductors $j$ discharge the corn therein, and the shovels $n$ $n$ cover it.

In this manner, we produce a strong, cheap, and simple machine, planting two rows at a time, and which can be managed by a single person.

Having thus described our invention,

What we claim, is—

1. The combination of the drag-bars $d$ and $e$, having their standards with shovels $m$ and $n$ attached, and arranged as described.

2. The arrangement of the rock-shaft $r$, provided with treadle $s$ and lever $t'$, the slides D, cross-bar P, spring $q$, and link $t$, substantially as and for the purpose set forth.

3. The arrangement of the rock-shaft $v$, with its arms $w$ $c'$, rods $f'$, levers $g'$, and hand-lever $x$, for operating the drag-bars $d$ $e$, substantially as described.

D. FITZPATRICK.
JOHN KNULL.

Witnesses:
S. T. McMORRAN,
GEORGE KNULL.